United States Patent [19]

Barker et al.

[11] Patent Number: 4,698,624
[45] Date of Patent: Oct. 6, 1987

[54] DEFINITION OF LINE UNIT SIZE

[75] Inventors: Barbara A. Barker, Williamson County; Irene H. Hernandez; Rex A. McCaskill, both of Travis County, all of Tex.

[73] Assignee: International Business Machines Corp., Armonk, N.Y.

[21] Appl. No.: 723,822

[22] Filed: Apr. 16, 1985

[51] Int. Cl.⁴ ............................................. G09G 1/00
[52] U.S. Cl. .................................... 340/709; 340/706; 400/76; 400/61
[58] Field of Search ............... 340/709, 722, 731, 735, 340/790, 706; 400/46, 44, 47, 548, 562, 568, 575.2, 61, 76

[56] References Cited

U.S. PATENT DOCUMENTS 2,245,142  6/1941  Crosman ........................... 400/575.2
4,464,652  8/1984  Lapson et al. ........................ 340/709
4,615,631  10/1986  Ueda et al. ........................... 400/568

*Primary Examiner*—Gerald L. Brigance
*Attorney, Agent, or Firm*—C. Lamont Whitham

[57] ABSTRACT

A computer based word processor or text editor is provided with a technique for defining line unit spacing which is particularly useful in a multi-font environment. A pop-down panel showing a miniature vertical scale line is displayed for the user. Adjacent the scale line is a handle which the user can select with a cursor. When the handle is selected, it may be moved up or down the scale line to the desired line unit spacing, at which time the handle is deselected. A numeric display of line unit spacing is also provided, and this display is continuously updated as the handle is moved. If the handle is moved to the top or bottom of the scale line, the scale line is moved up or down.

4 Claims, 5 Drawing Figures

DEFINITION OF LINE UNIT SIZE

TECHNICAL FIELD

The present invention generally relates to computer based word processors or text editors and, more particularly, to a method which allows the operator to define the unit of measurement for a single line of text data.

PRIOR ART

Various techniques are known in the art for defining line spacing in a word processor or a text editor. For example, the application program may have a series of menus, one of which would relate to page formatting. The user would be required to either select one of several possible choices or fill in the blanks of the displayed menu to specify line spacing. Alternatively, the application program may be command driven wherein a specific command must be input to indicate a change in line spacing, and this command must then be followed with the spacing that is desired. In either of the fill-in-the-blanks menu or command approaches, the line spacing might be stated simply as single space, double space and so forth, or the number of lines per unit measure as six lines per inch, or a combination of these two.

As a specific example, in a traditional word processing environment which is character display oriented, the user is provided with options for specifying the first typing line of a page, the last typing line of a page, the line spacing, and the number of lines per a unit of measurement; e.g., per inch or per centimeter. The user then must measure the size of a page in terms of the number of lines on the printable page using a fixed character font size. For example, for 8½×11 inch paper, the user can define the page as 66 lines per page or 6 lines per inch, the unit of measure for a single line unit being 1/6th of an inch or approximately 0.16 inch.

These approaches have several disadvantages. First, in the simple choice menu, there is not sufficient flexibility of choice for all types of documents. In the more complex fill-in-the-blanks menu and command driven applications, considerable flexibility is often afforded but with the requirement that the user make various arithmetical computations.

The approaches discussed thus far assumed a character box display where all characters are displayed from a single font of uniform size. The trend today, however, is to use all points addressable (APA) displays wherein each pixel of the display may be individually addressed. These displays allow for a multi-font environment and for fonts of various sizes. In such an environment, the conventional lines per inch measurement has no meaning since the line height may vary depending on the size of the font. The traditional character box display also is incapable of accurately showing what will be printed in terms of actual spacing between lines. On the other hand, a what-you-see-is-what-you-get display is made possible by the all points addressable display.

SUMMARY OF THE INVENTION

It is therefore an object of the present invention to provide a method that allows the operator of a word processing or text editing application an easy way to define a unit of measurement for a single line.

It is a further object of the invention to provide a method of defining line spacing in an all points addressable, multi-font display text editor environment.

It is another object of the invention to provide a flexible method of defining line spacing in a word processor or text editor that does not require arithmetical calculations.

According to the invention, the user is presented with a pop-down panel which shows a miniature scrollable vertical scale line. The scale line includes a handle icon which allows the user to move the handle up and down on the scale line. The location where the user stops moving the handle will be the new line spacing size. The new line size will be reflected or marked at each appropriate interval on the full vertical scale line displayed within a window that also contains the document window. When the user specifies that the line spacing is a certain number of lines, the editor will use the latest line measurement defined by the user.

This approach provides the user with more flexibility in an easy to use procedure. The line unit size may be utilized to define the base line for placement of the characters on a line. Because the characters on a line may be of varying font sizes, the characters on one line may overlap with the characters on a previous line if the line unit size allocated by the user is not as large as the largest character on the line. The invention provides a way for the user to define the base line of the following line to not overlap the characters of the previous line or to have the system automatically adjust any base line whenever this condition occurs.

The invention can also allow the user to define the line unit size on an object basis. For example, one paragraph may be defined to have six lines per inch, while another may define twelve lines per inch. The line unit size may also be used to define the amount of line spacing between text lines. For example, in a traditional word processing environment, when the user specifies double line spacing, a single blank line of a fixed character height is used to determine the size of the blank line. Using this invention, the user can define the size of the blank line to be equivalent to any line unit size.

BRIEF DESCRIPTION OF THE DRAWINGS

The foregoing and other objects, aspects and advantages of the invention will be better understood from the following detailed description of a preferred embodiment with reference to the drawings, in which.

DETILED DESCRIPTION OF THE PREFERRED EMBODIMENT OF THE INVENTION

Figure 1:
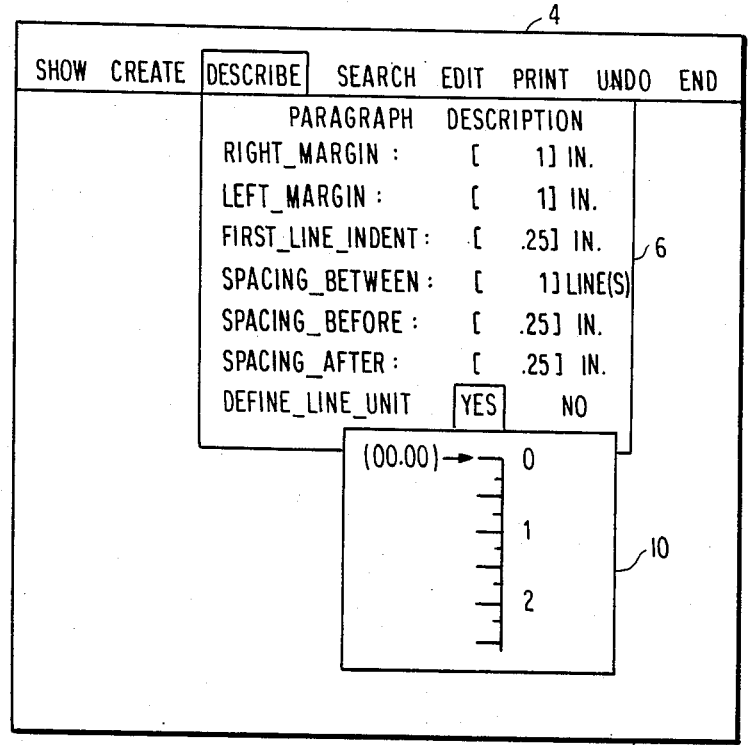
FIG. 1 illustrates a document window on an all points addressable display showing a command bar, a describe pop-down panel, and a scale line pop-down panel according to the invention.

For a more detailed understanding of the invention, reference is first made to FIG. 1 which illustrates a document window displayed on an all points addressable display. Such a display could be a cathode ray tube (CRT) or plasma gas panel, for example, controlled by a standalone or host connected computer or work station. At the top of the document window 2 is a command bar 4 which includes several allowable commands available to the user. One of these is the DESCRIBE command which, for purposes of this description, is assumed to have been selected by the user. Selection may be typically made by a pointing device such as a mouse; that is, a pointing cursor is moved under control of the mouse until the cursor is over the DESCRIBE command in the command bar and then the select button on the mouse is pressed. The process by which this is done is well known in the art and therefore will not be described further. When the DESCRIBE command is selected, a paragraph description pop-down panel 6 appears on the all points addressable display. The application is in full control as to the location of panel 6 on the display and as to whether the panel is overlaying any other data displayed. It will be observed that the paragraph description pop down panel comprises a menu of selectable parameters for defining margins and spacings in text data. In the illustrated example, the last of these parameters is the definition of the line unit. Prior applications expected the user to enter this parameter as a number of lines per unit of measure.

According to the invention, selecting YES for the definition of line unit causes another pop down panel to appear on the all points addressable display. This pop-down panel 10 contains a mini scale line. Again, the application controls the location on the display of the panel 10 and whether it overlaps any other data displayed. It is assumed that the application provides the user with a way for requesting the panel 10 by, for example, moving the cursor to Define$_{13}$ Line$_{13}$ Unit and typing YES or simply the letter Y.

Figure 2:
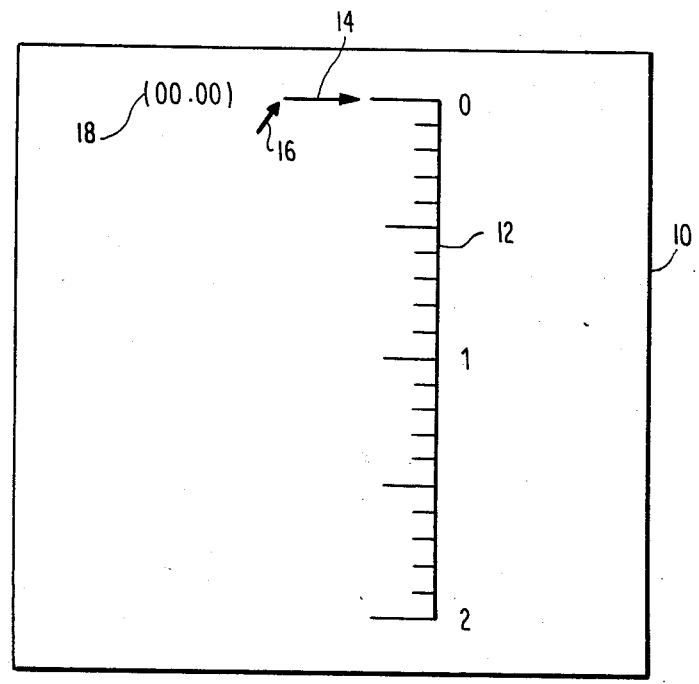
FIG. 2 shows the scale line pop-down panel with a movable handle used for determining the size of a line unit.

Once the panel is requested, the panel may be displayed as shown in FIG. 2. The panel consists of a vertical ruler 12 representing a unit of measurement, that is, inches, centimeters or some other measurement unit. Depending on the resolution of the display, the application will as feasibly as possible, represent a true view of a ruler 12 in the desired unit of measurement. For the purposes of this example, ruler 12 is being displayed in inches. Handle 14 represents a handle the user may select using cursor 16 to move upwards or downwards to define the unit of measurement for a single line. To assist the user in determining the size of a line unit as handle 14 is moved, the line unit size 18 is shown next to the handle 14. Cursor 16 is attached to a device, such as a mouse, keyboard, joystick, or similar well known cursor control device, and is used to select and move the handle 14 to a new position on the ruler 12. The application may choose to default the handle position at the last line unit measurement. For the purposes of this example, the handle has been defaulted to zero.

Figure 3:
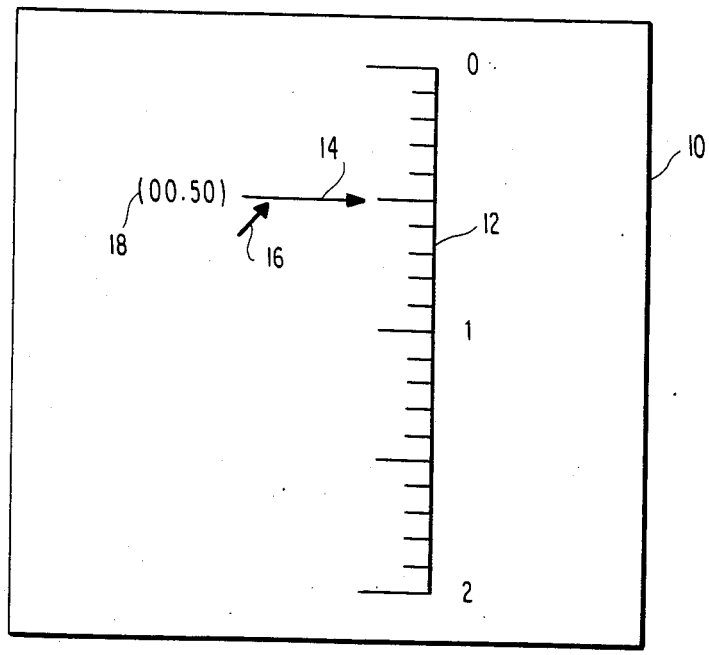
FIG. 3 shows the scale line pop-down panel of FIG. 2 with the handle being moved by a cursor to a new position on the scale line.
Figure 4:
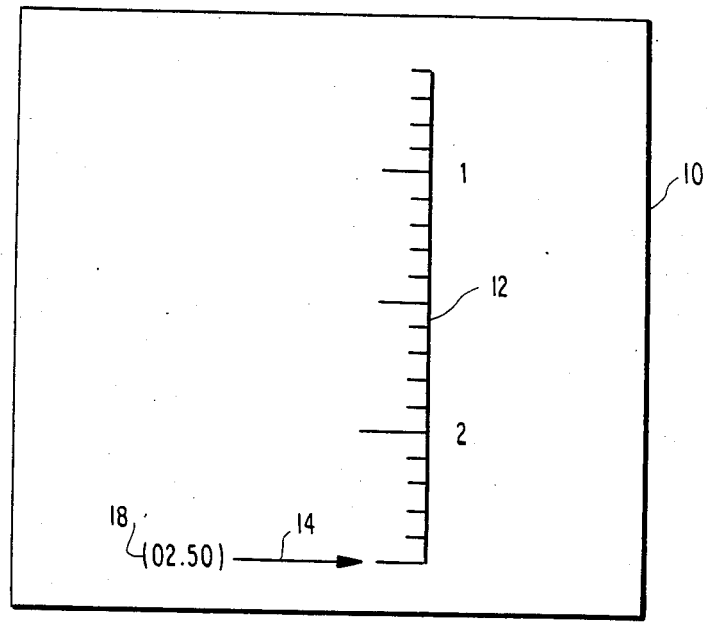
FIG. 4 shows the scale line scrolling when the handle shown in FIG. 2 moves beyond the last visible measurement on the scale line.

Referring now to FIG. 3, the user has selected handle 14 and has moved it downwards on the ruler 12. The new line size is reflected in line unit size 18. Leaving handle 14 at this location would define a line unit as ½ inch, or 2 lines per inch. As the user continues to move the handle 14 downwards, the ruler 2 scrolls to accommodate additional units of measurements. FIG. 4, shows ruler 12 after the user has moved the handle 14 beyond the scale amount shown in ruler 12 of FIG. 3. Handle 14 is located at line unit size 18, or 2½ inches. Since the length of ruler 12 is variable depending on the application, the amount of ruler 12 available for scrolling is also variable.

Set out below is an illustration of an application program useable by a processor in the work station or host computer for interactively defining the size of a line in either all points addressable or character mode. The size of the line is then used to visually convey how many printed or displayed lines will occupy a vertical unit of measurement. This program is in program design language (PDL) from which source and machine code are derivable. In the following, it is assumed that the work station is under at least keyboard device control.

```
CALL GET_USER_ACTION(USER_ACTION)
IF USER_ACTION = 'DEFINE LINE UNIT SIZE'
THEN CALL DISPLAY_VRULER(LU_SIZE, NUM_VALUE)
IF USER SELECTS LINE UNIT HANDLE
THEN REPEAT
CALL TRACK_DIRECTION(YDIRECTION, LU_SIZE)
IF YDIRECTION = UP
THEN DECREASE LINE UNIT SIZE
ELSE INCREASE LINE UNIT SIZE
ENDIF
CALL CONVERT_SIZE(LU_SIZE, YSCREEN_UNITS)
CALL UPDATE_VALUE(YSCREEN_UNITS, NUM_VAL)
UNTIL HANDLE NO LONGER SELECTED
ENDIF
ENDIF
```

During an interactive editing session, a user can define the size of a line to be used in determining how many lines of text or white space are to occupy a vertical unit of measurement. To execute this task, the system calls a routine to determine the action selected by the user (CALL GET_USER_ACTION). If the action selected (USER_ACTION) is to define the line unit size, the system calls a routine (CALL DISPLAY_VRULER (LU_SIZE, NUM_VALUE)) to display the line unit size on a vertical ruler. The vertical ruler is evenly marked in inches, centimeters or some other unit of measurement. The currently defined line unit size (LU_SIZE) is marked on the vertical ruler and the numeric value (NUM_VALUE) is displayed. The line unit size can be equated to the number of lines per vertical unit of measurement. The user can use this representation to specify the spacing of lines within a paragraph or the amount of spacing before or after a text, graphic or table object. The system will not update white space belonging to a previously created object unless the operator explicitly edits the object (or property of the object) causing the white space size to be redefined.

A selectable handle is provided at the line unit mark location. If this handle is selected with a mouse or other selection device, the size of the line unit is increased or decreased depending on the direction the device is moved. The system calls a routine (CALL TRACK_DIRECTION (YDIRECTION, LU_SIZE)) to determine the movement of the device. YDIRECTION is used to indicate upward or downward movement of the device; LU_SIZE is used to show the change in the line unit size. If Y_DIRECTION= up, then the size is increased. Next, a routine is called (CALL CONVERT_SIZE) to convert the new size (LU_SIZE) to generic screen units (YSCREEN_UNITS). The UPDATE_VALUE routine converts YSCREEN_UNITS into the units represented on the vertical ruler and updates the numeric value (NUM_VALUE). NUM_VALUE represents a certain number of lines per measurement unit. The above steps are repeated until the operator releases the handle, i.e., the handle is deselected or no longer selected.

Figure 5:
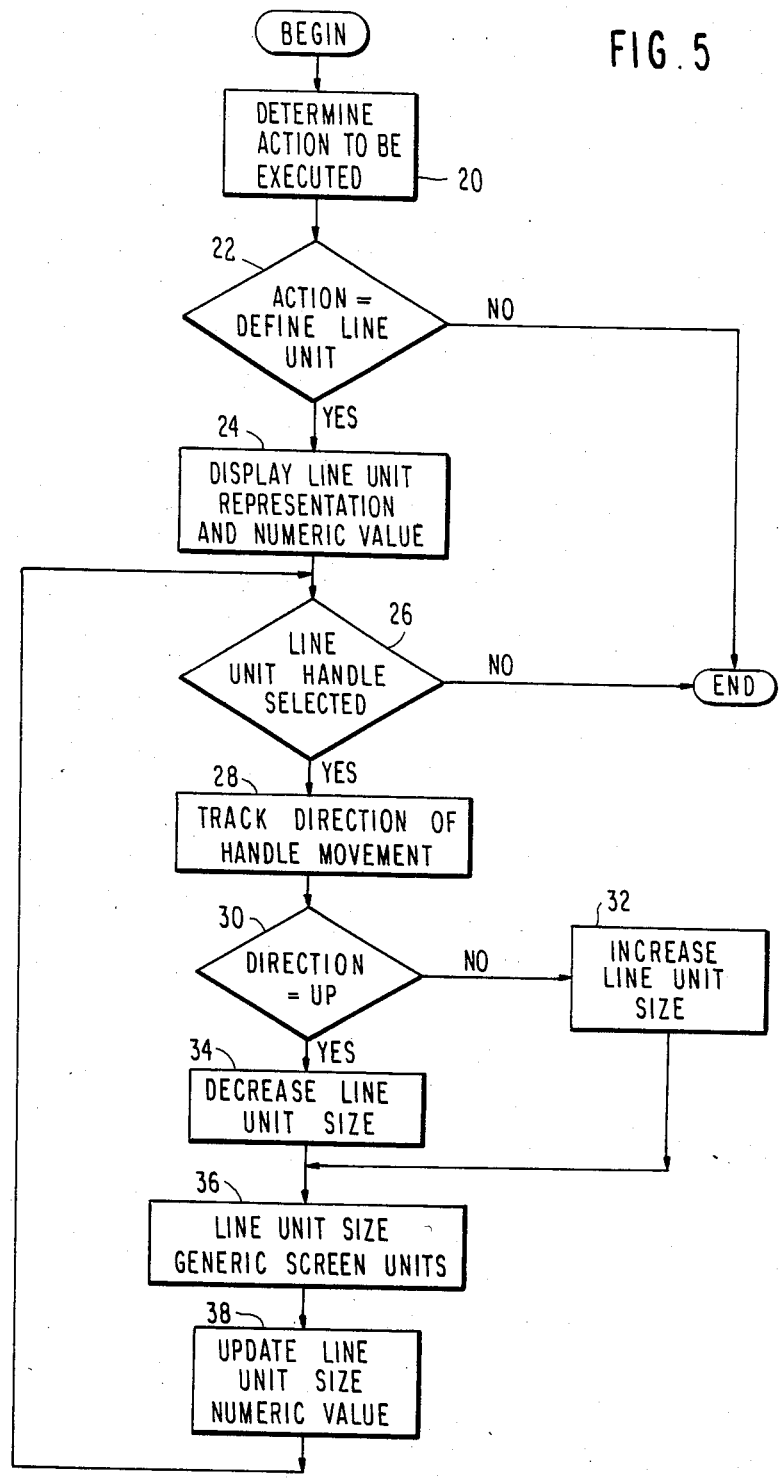
FIG. 5 is a flow diagram illustrating the operation of the invention.

Reference is next made to the flow diagram shown in FIG. 5 which illustrates the user and system operations for defining the size of a line unit according to the invention.

First, the system determines what user action is to be executed as indicated by block 20. If that action is to define a new size for a line unit, the flow of control is through block 22 to block 24 where the system displays a vertical ruler showing the current line unit size and numeric value. The vertical ruler is evenly marked in some unit of measurement. The location of the line unit handle on the vertical ruler indicates the defined line unit size.

Next, as shown in block 26, the system checks to see if the user has selected the line unit handle. If the line unit handle has been selected, the system begins to track the movement of the handle as indicated by block 28. The system monitors the direction the handle is moved as long as the line unit handle remains selected. If the handle is moved in an upward direction, the size of the line unit is decreased. But, if the direction of movement is down, the size is increased. Blocks 30, 32 and 34 show these actions.

After indicating the change in size on the vertical ruler, the system converts the size to generic screen units. Next, the system calculates the numeric value in terms of the generic screen units, and updates the value being displayed to the user. These steps are shown in blocks 36 and 38.

While the invention has been particularly shown and described with respect to a preferred embodiment thereof, it will be understood by those skilled in the art that changes can be made in form and detail without departing from the scope and spirit of the invention.

Having thus described our invention, what we claim as new, and desire to secure by Letters Patent is:

1. A method of defining line unit size in a computer based text editor, said computer having an all points addressable display and a keyboard, said method comprising the steps of displaying a vertical scale line and a handle selectable by means of a cursor adjacent the scale line, selecting the handle with a cursor and moving the handle to a position on the scale line which represents the desired line unit size, and providing an input to the computer deselecting the handle to define the line unit size as indicated by the position of the handle relative to the scale line.

2. The methods of claim 1 further comprising the steps of displaying a numeric value of the line unit size, and updating said numeric value as said handle is moved.

3. The method of claim 2 wherein said vertical scale line is scrollable on said display, said method further comprising the step of scrolling said scale line when the handle is moved to the top or bottom of said scale line.

4. The method of claim 2 wherein said computer further includes a cursor control device, said step of selecting the handle with the cursor including the step of positioning the cursor adjacent to the handle with said cursor control device.

* * * * *